United States Patent
Kitamura et al.

(10) Patent No.: US 6,816,948 B2
(45) Date of Patent: Nov. 9, 2004

(54) STORAGE SYSTEM CERTIFYING A HOST COMPUTER

(75) Inventors: Manabu Kitamura, Yokohama (JP); Koji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 210 days.

(21) Appl. No.: 09/923,429

(22) Filed: Aug. 8, 2001

(65) Prior Publication Data

US 2002/0199071 A1 Dec. 26, 2002

(30) Foreign Application Priority Data

Jun. 21, 2001 (JP) ........................................ 2001-187481

(51) Int. Cl.[7] .............................................. G06F 12/00
(52) U.S. Cl. ........................... 711/152; 711/4; 711/163; 711/173; 709/229
(58) Field of Search ............................. 711/4, 114, 163, 711/152, 173; 709/229, 213

(56) References Cited

U.S. PATENT DOCUMENTS

| | | | |
|---|---|---|---|
| 6,128,683 A | * 10/2000 | Griese et al. | ............... 710/107 |
| 6,330,210 B1 | * 12/2001 | Weirauch et al. | ......... 369/30.11 |
| 6,343,324 B1 | * 1/2002 | Hubis et al. | ................. 709/229 |
| 6,360,303 B1 | * 3/2002 | Wisler et al. | ................ 711/152 |
| 6,480,934 B1 | * 11/2002 | Hino et al. | ................... 711/114 |
| 2002/0103913 A1 | * 8/2002 | Tawil et al. | ................. 709/229 |
| 2002/0129212 A1 | * 9/2002 | Lee et al. | .................... 711/152 |

* cited by examiner

*Primary Examiner*—Kevin Verbrugge
*Assistant Examiner*—Jasmine Song
(74) *Attorney, Agent, or Firm*—Antonelli, Terry, Stout & Kraus, LLP

(57) ABSTRACT

In a storage area network (SAN), when a host accesses a storage system, the host is certified to restrict any unauthorized access. The storage system includes an access setting section and a certifying section to restrict accesses from respective hosts. When a host accesses data on a disk, the host issues an inquiry to a file server program of a host to receive information of a physical location of a file containing the data on the disk. The host accesses the disk according to the information. Simultaneously, the file server program allows, by a disk management program, the access to the area specified by the access request from the host.

6 Claims, 4 Drawing Sheets

| PORT ID | START BLOCK | END BLOCK |
|---------|-------------|-----------|
| 00 | 0 | 100 |
| 01 | 1000 | 5000 |
| ⋮ | | |
| N | XXX | XXXXXX |

STORAGE SYSTEM CERTIFYING A HOST COMPUTER

BACKGROUND OF THE INVENTION

The present invention relates to a storage system sharing method in an information processing system, and in particular, to a method, for use in a computer system in which a storage system is interconnected with a plurality of computers via Fibre Channel or the like, of sharing the storage system according to access control.

When data is communicated between a plurality of host computers (hosts) by sharing the data or by transferring files, a network interface such as "Ethernet" is used in general. On the other hand, there may be used a storage system which can be accessed by a plurality of hosts.

For example, it can be considered that data is communicated between a plurality of hosts such that a file created by a mainframe host among the hosts is accessed by a computer in an open system (an open host) such as UNIX. Specifically, there exists a method in which by using a storage system including a plurality of interfaces for connections to both of a mainframe host and an open host, a plurality of hosts directly access the storage system to resultantly share data therebetween. JP-A-09-258908 describes this method.

On the other hand, there exists a technique in which a storage area network (SAN) is configured by connecting a plurality of hosts and a plurality of storage systems to each other via a Fibre Channel capable of transferring data at a high speed.

Any host constituting the SAN can access any storage system in the SAN. Therefore, a plurality of hosts can easily share any storage system without using the storage system including a plurality of interfaces described in JP-A-09-258908.

However, since all hosts in the SAN can freely access the storage systems in the SAN, there arises a problem that security is not guaranteed when a host in the SAN accesses an associated storage system in the SAN.

To solve the problem, there has been devised a method of guaranteeing security when a host in the SAN accesses a storage system thereof.

In a concrete method, an identifier of each host which is allowed to access a storage system or a logical unit (LU) in the storage system is registered to the storage system in advance. When a host accesses a storage system, the storage system refers to the registered identifiers to determine that the access is granted or rejected. JP-A-10-333839 describes the technique.

By the prior art, it is possible to impose restrictions on the access from each host to the logical units. However, in an actual computer system, it is required depending on cases that the access is restricted at a finer level, for example, a file level. For example, there is required restriction that only particular users can access a certain file. In this case, the access restriction at the logical unit level described in JP-A-10-333839 cannot restrict the access at the required file level.

SUMMARY OF THE INVENTION

It is therefore the object of the present invention to provide an access restriction method at a finer and securer level in a data sharing method using a storage system in an SAN environment.

Description will be given of a system of the present invention to attain the object. A computer system of the present invention includes a plurality of host computers and a storage system. The storage system includes at least one disk (device) and is connected to each host computer via a Fibre Channel switch.

In the computer system of the present invention, the storage system rejects access from each host computer in principle. A host computer which desires to access the storage system sets a request to the storage system that the storage system allows the access. The setting for access allowance/rejection can be conducted for each desired area of the disks. In the computer system, one of the host computers includes a unit to indicate the setting/release of access allowance for the storage system. When a host computer desires to access data in the storage system, the host computer sends a request of access allowance setting to the pertinent host computer including the unit. When the pertinent host computer issues an indication to the storage system, the storage system conducts certification using a password. The indicating host computer including the unit indicates the storage system to allow the access to a pertinent area on the disk so that the computer having issued the access request accesses data on the disk. Thereafter, the computer having issued the request accesses the data on the disk. When the access is completed, the computer requests the indicating computer to release the setting of access allowance. The indicating computer indicates the storage system to release the access allowance setting for the area. The storage system accordingly releases the setting of access allowance for the area.

BRIEF DESCRIPTION OF THE DRAWINGS

The present invention will be more apparent from the following detailed description, when taken in conjunction with the accompanying drawings, in which.

DESCRIPTION OF THE EMBODIMENTS

Figure 1:
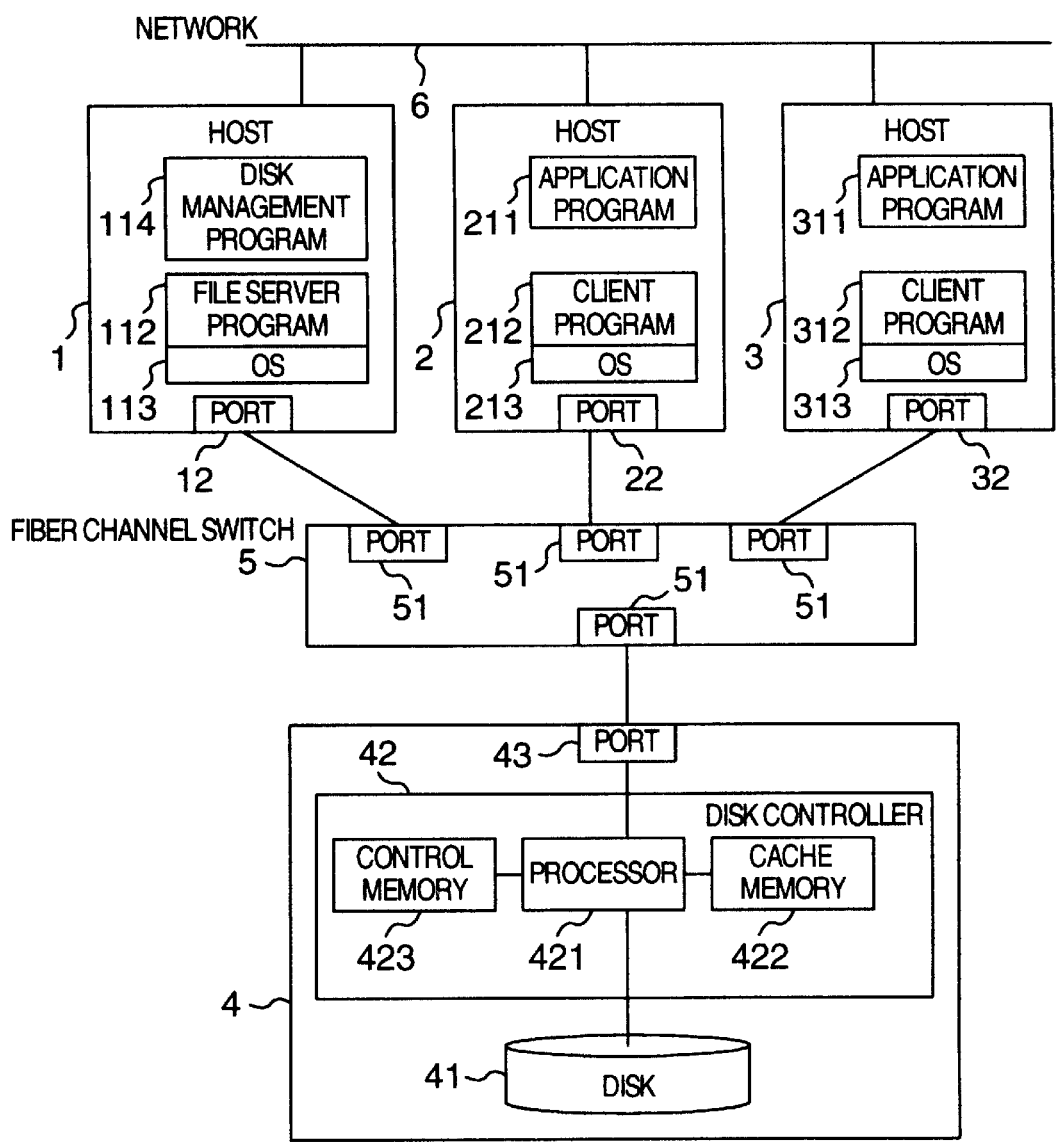
FIG. 1 is a block diagram showing a configuration example of a computer system according to the present invention.

FIG. 1 shows a configuration of a computer system according to the present invention.

The computer system includes hosts 1 to 3, a storage system 4 connected to the host 1, a Fibre Channel switch 5 to connect the hosts 1 to 3 and the storage system 4 to each other, and a network 6 to interconnect the hosts 1 to 3 to each other.

The hosts 1, 2, and 3 respectively include ports 12, 22, and 32 of which each is connected to the Fibre Channel switch 5.

The host 1 stores a file server program 112, an operating system (OS) 113, and a disk management program 114. The host 2 stores an application program 211, a client program 212, and an operating system 213. The host 3 stores an application program 311, a client program 312, and an operating system 313.

The storage system 4 includes a disk 41, a disk controller 42, and a port 43 connected to the hosts 1 to 3. Although the storage system 4 includes one physical disk apparatus in FIG. 1, a plurality of disk apparatuses may be included. It is also possible that a plurality of disk apparatuses are configured as in a disk array so as to virtually appear as one or a plurality of logical disk apparatuses for the hosts 1 to 3 and the like.

The disk controller 42 includes a processor 421, a cache memory 422, and a control memory 423. The processor 421 conducts various control operations, for example, receiving an access from the host 1 or the like, reading/writing data on the disk 41, and data conversion when reading/writing data on the disk 41.

The cache memory 422 stores data frequently read from the disk 41 or temporarily stores write data to be transferred from the host 1 or the like to the storage system 4 to thereby increase the speed of processing accesses from the host 1 or the like. The control memory 423 stores a program to be executed by the processor 421 and information of the host 1 or the like connected via the Fibre Channel switch 5 thereto.

Functions of the file server program 112 and the client programs 212 and 312 will be described.

In the computer system of the present embodiment, the application programs 211 and 311 executed in the hosts 2 and 3 access via the respective client programs 212 and 312, in a shared fashion, files stored on the disk 41. That is, the client programs 212 and 312 serve as a file system. In this connection, there exists a host in which the client program 212 or the like is incorporated in the operating system 213 depending on the configuration of the host. The present invention is also applicable to such a case.

The operating systems 113, 213, and 313 may be of the same type or may be of mutually different types. The file server program 112 integratedly manages files stored on the disk 41. That is, for each file on the disk 41, the file server program 112 manages a stored location and the like of the file.

Therefore, before accessing a file on the disk 41, the client program 212 accesses the file server program 112 via the network to inquire a physical location of the file as the access target on the disk 41.

Having received the inquiry, the file server program 112 notifies the client program 212 of the physical location of the file. According to the notified information, the client program 212 directly accesses the file stored on the disk 41 of the storage system 4 via a port 22.

Figures 2, 3:
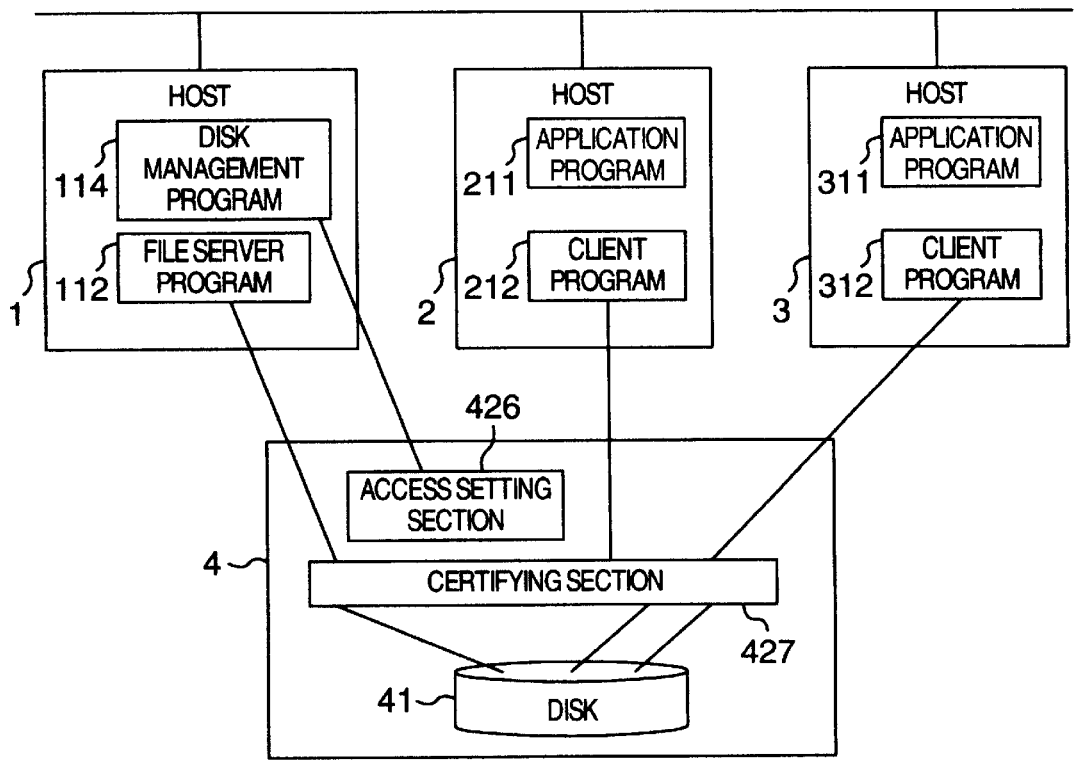
FIG. 2 is a block diagram showing logical connections between the hosts and the storage system of a computer system according to the present invention.
FIG. 3 is a diagram showing contents of an access list 500.

FIG. 2 shows a logical image of operation when the hosts 1 to 3 access the storage system 4.

An access setting section 426 and a certifying section 427 are actually implemented by programs executed by a processor 422 of the storage system 4. The application programs 211 and 311 access the storage system 4 respectively via the client programs 212 and 312 in principle.

When the application programs 211 and 311 operate respectively via the client programs 212 and 312 according to the principle, there occurs no unauthorized or wrong access to the storage system 4. However, it is also possible to create a program which directly access the storage system 4 without using the client program 212 or the like. When such a program is executed, for example, in the host 2, the program may conduct a wrong access to the storage system 4. Therefore, the storage system 4 restricts the accesses from the host 2 and the like by a certifying section 427.

FIG. 3 shows contents of an access list 500 stored in the control memory 421 in the storage system 4. Registered in the access list 500 is information which the file server program 112 sends to the storage system 4.

In a storage area network (SAN) in which a plurality of hosts and storage systems are coupled via a Fibre Channel switch with each other as in the present embodiment, each of the hosts and the storage systems is assigned with a port identifier (ID) unique in the SAN. Each command sent from, for example, the host 1 to the storage system 4 includes the port ID assigned to the sending host. A port ID entry 501 of the access list 500 stores the port ID sent from the host 1 and the like.

Therefore, by comparing the port ID contained in the command from the host with the port ID stored in the port ID entry 501, the storage system 4 can identify the host which has issued the pertinent command.

Stored in a start block field 502 and an end block field 503 of the access list 500 are information indicating a logical block address (LBA) of a start position of a storage area on the disk 41 and information indicating an LBA of an end position of the storage area on the disk 41 which can be accessed by the host corresponding to the port ID stored in the port ID entry 501 associated with corresponding start block field 502 and end block field 503. When an LBA specified by a write command from a host having a port ID indicated by the port ID 501 is within an LBA range from the LBA stored in the start block field 502 corresponding to the port ID 501 to the LBA stored in the end block field 503 corresponding to the port ID 501, the storage system 4 allows the access from the host.

Conversely, when the port ID is not registered in the access list 500 and also when the LBA specified by the write command is not within the range between the start block 502 and the end block 503, the storage system 4 rejects any access from the host.

This means that in the initial state in which the access list 500 stores nothing, all accesses from the hosts are rejected. Therefore, the host 1 or the like must, before the host 1 starts using the storage system, register its own port ID in the access list 500 by using the disk management program 114 in the host 1.

Having received the indication of port ID registration from the host 2 or the like, the disk management program 114 sends a password to the storage system 4. The storage system 4 certifies the password. If the password is correct, the storage system 4 allows the access from the disk management program 114. Having received allowance of the access, the disk management program 114 sends a port ID of the host for which the access is to be allowed and LBA range information indicating an area on the disk 41 where the access is to be allowed. The storage system 4 registers the information received from the disk management program 114 in the access list 500.

The password may be a password beforehand set when the storage subsystem is delivered from the factory thereof or a password freely set from a maintenance terminal connected to or integrally installed in the storage subsystem 4.

Figure 4:
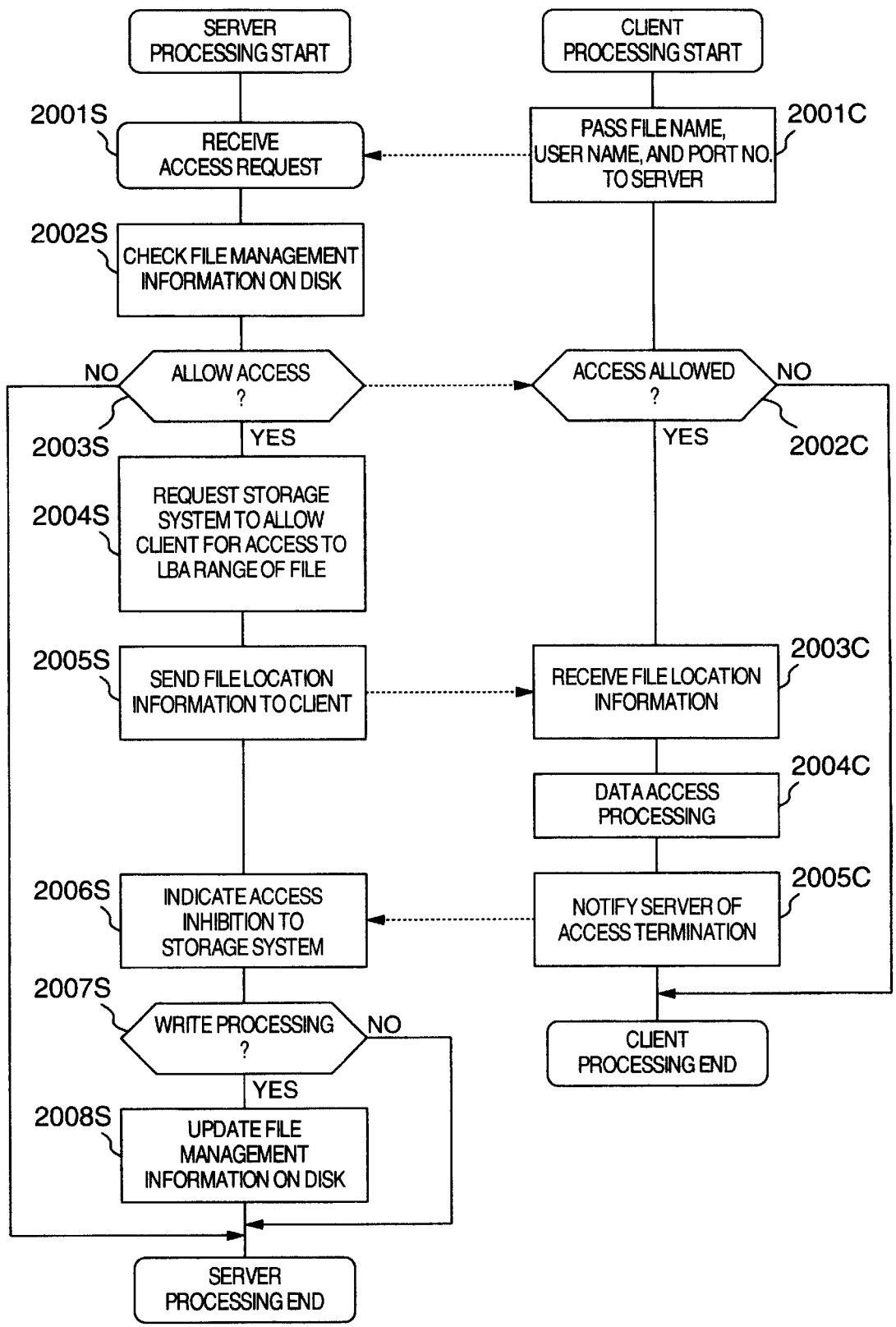
FIG. 4 is a flowchart showing a flow of processing of a file server program 112 and a client program 212 or 312.

FIG. 4 shows a processing flow of the file server program 112 and the client program 212 in a flowchart.

Having received a request from the application program 211 to access a file stored in the storage system 4, the client program 212 requests the file server program 112 in the host 1 to access the storage system 4. In requesting, the client program 212 sends a file name of the file to be accessed and an access type (read/write) as well as information necessary for the certification, such as a user name and a port ID of the host 2, to the file server program 112 (step 2001C).

The file server program 112 in the host 1 having received the access request from the client program 212 checks file management information stored on the disk 41 in the storage system 4 and then reads therefrom attribute information, such as LBA at which the target file is written on the disk 41 (step 2002S). The file management information includes information indicating a physical location at which the file is stored on the disk 41 and information indicating attributes, for example, an owner of the file.

In this connection, when the host 1 checks by using the file server program 112 the file management information stored on the disk 41, the access is restricted. Therefore, for the host 1 to be able to read the file management information stored on the disk 41, it is necessary that the port ID of the host 1 and an LBA range on the disk 41 in which the file management information is stored are registered by using the disk management program 114 in advance.

Thereafter, the host 1 determines according to the obtained file management information whether or not the access of the file for which the access request is received from the client is allowed and then notifies the client of a result of the determination (step 2003S). For example, in a case in which the attribute information of the pertinent file indicates "only read allowed", when a read request is received from a client, the access can be allowed. However, when a write request is received, the access is rejected. Having received the notification, the client recognizes that the access is allowed or rejected (step 2002C). If the access is allowed, the processing goes to step 2003C; otherwise, the processing is terminated.

Subsequently, the host 1 transmits by using the disk management program 114 a port ID of the host 2 and a start LBA and an end LBA indicating a location of the file which is allowed to be accessed by the host 2 to the storage system 4 to thereby request allowance for the access (step 2004S). The access setting section 426 in the storage system 4 registers the port ID and the start LBA and the end LBA of the disk which is allowed to be accessed in the access list 500. After the registration is finished, the access setting section 426 sends a registration completion report to the host 1. Specific processing of the access setting section 426 will be described later.

The host 1 having received the registration completion report from the storage system 4 sends by using the client program 212 the location information of the target file to the host 2. Concretely, the location information of the file is the information to indicate the LBA range sent to the storage system (step 2004S).

Having received the location information of the file, the client program 212 of the host 2 actually accesses the storage system 4 to conduct a data read or write operation (step 2003C or 2004C). When the data access is finished, the host 2 notifies the host 1 that the access processing is finished for the storage system 4. The client program 212 then terminates the processing (step 2005C).

The host 1 having receives the access processing completion report indicates, by using the file server program 112 and the disk management program 114, the access termination of the host 2 to the storage system 4 (step 2005S). Specifically, the storage system 4 deletes, by using the access setting section 426, entries regarding the host 2 from the access list 500.

Thereafter, when the processing of the client program 212 is a write operation, the host 1 updates by using the disk management program 114 the file management information on the disk 41 (step 2007S and step 2008S) and terminates the processing. When the processing of the client program 212 is a read operation, the host 1 immediately terminates the processing.

Figure 5:
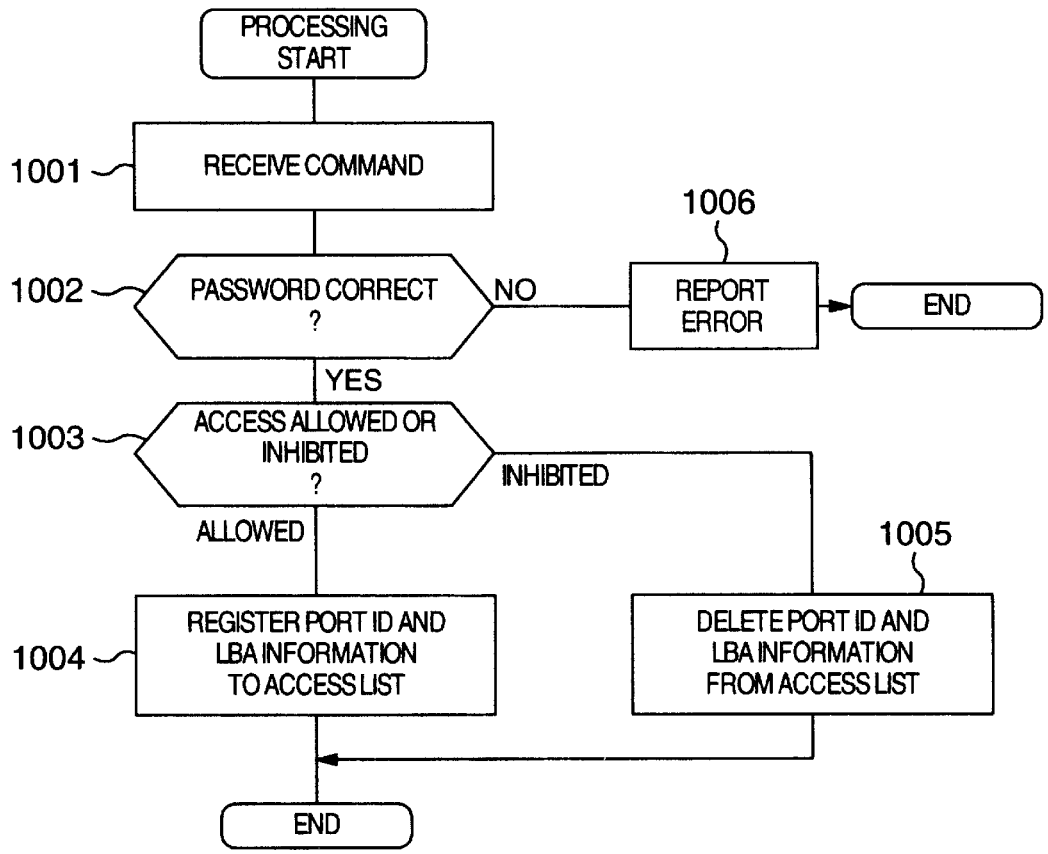
FIG. 5 is a flowchart showing processing to register access allowance information to a storage system 4.

FIG. 5 shows, in a flowchart, processing of the access setting section 426 in the storage subsystem 4 when the disk management program 114 in the host 1 requests the storage system 4 to allow an access to a particular area of the disk 41 or to inhibit an access to an areas for which an access is beforehand allowed.

The disk management program 114 of the host 1 sends to the storage system 4 a command including a password, a port ID of a host for which the access to the storage system 4 is to be allowed, and a start LBA and an end LBA of an area to be accessed. The command to send a port ID, LBA information, and the like to the storage system 4 is unique only to the storage system 4.

The storage system 4 receive the command including the port ID from the host 1 (step 1001). The access setting section 426 in the storage system 4 then determines whether or not the password in the command is correct (step 1002). If the password is not correct, the access setting section 426 sends an error message to the host 1 and terminates the processing (step 1006).

If the password is correct, the access setting section 426 determines that the received command requests allowance or inhibition of access (step 1003). If the command requests access allowance, the access setting section 426 registers information of the port ID, the start LBA, and the end LBA contained in the command in the access list 500 (step 1004). If the command requests access inhibition, the access setting section 426 deletes information corresponding to the port ID, the start LBA, and the end LBA contained in the command from the access list 500 (step 1005).

Figure 6:
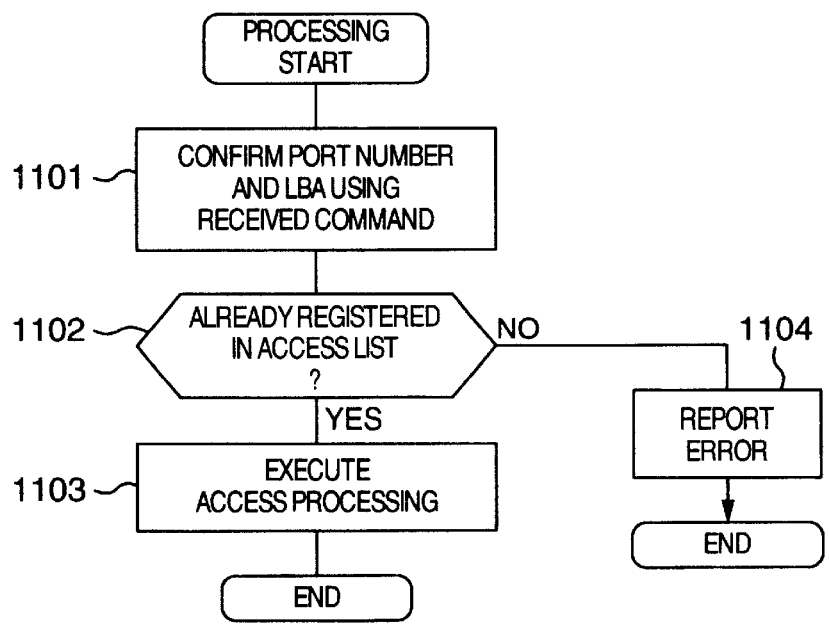
FIG. 6 is a flowchart showing a flow of processing when the storage system 4 receives a read/write access request.

FIG. 6 shows processing of the storage system 4 on receiving a read/write access from the host 1, 2, or 3 in a flowchart.

When the storage system 4 receives a command, for example, from the host 1, the certifying section 427 in the storage system 4 confirms information contained in the received command such as a port ID and LBA information of an area to be accessed (step 1101). The certifying section 427 then checks a set of the confirmed port ID and the LBA range matches, namely, determines whether or not the port ID matches that registered in the access list 500 and whether or not the LBA range is within that registered therein (step 1102). If the port ID has been registered in the access list 500 and the LBA range is within that registered to the access list 500, the certifying section 427 allows the access and the storage system 4 executes processing of the access requested by the host 1 (step 1103). If the port ID has not been registered or if the port ID has been registered and the LBA range is beyond that registered in the access list 500, the certifying section 427 sends an error message to the host 1 and terminates the processing (step 1104).

By the processing described above, the access limitation or restriction can be executed at a finer level than prior art in the SAN environment in which a plurality of hosts and a plurality of storage systems are interconnected to each other. In the embodiment shown in FIG. 4, although access allowance is determined for an LBA range of the entire file in response to one access request from a client, it is not necessarily required to determine access allowance for the entire file. It is also possible to use a method in which the access allowance is determined for an area necessary for the client for one access.

In the description of the embodiment, the access control operation is conducted in an environment in which the hosts and the storages are interconnected via a Fibre Channel to each other. However, the present invention is applicable to any environment in which the hosts and the storages are interconnected to each other. For example, a storage which supports "SCSI over IP" protocol and which can be directly connected to Ethernet is emerging today. It is therefore likely that an environment in which a plurality of hosts and a plurality of storages are interconnected via Ethernet is widespread. Also in such a case, the access restriction can be conducted at a finer level by the technique of the present invention.

According to the computer system of the present invention, the access restriction can be conducted in an environment in which a plurality of host computers are connected to a shared or common storage. Therefore, information cannot be accessed by any unauthorized party and hence cannot be easily stolen.

While the present invention has been described in detail and pictorially in the accompanying drawings, it is not limited to such details since many changes and modifications recognizable to those of ordinary skill in the art may be made to the invention without departing from the spirit and scope thereof.

What is claimed is:

1. A computer system, comprising:

a first computer;

a second computer; and a storage system coupled to said first and second computers;

wherein said storage system comprises:

at least one storage device which can be accessed from said first and said second computers, an access list including an ID assigned to a computer, a start address, and an end address, an ID in said access list indicates a computer which can access a storage area in said at least one storage device specified by the corresponding start address and the corresponding end address, and a disk controller allowing or inhibiting access from said second computer to a storage area in said at least one storage device by referring to said access list, wherein said first computer comprises:

address obtaining means for obtaining an address range of a target file based on a file ID received from said second computer, setting means for setting said access list to allow said second computer access a storage area in said storage system in which the target file is stored, and address sending means for sending said address range of a target file to said second computer, and when said first computer receives a request including a file ID from said second computer, said address obtaining means obtains an address range of a target file based on the received file ID, said setting means sends an access allowance request including the obtained address range and an ID of said second computer to said storage system, said disk controller registers the received address range and the received ID of said second computer to said access list, said address sending means sends the obtained address range to said second computer, and said second computer issues the access request including the address range received from said first computer to said storage system for accessing the target file.

2. A computer system according to claim 1, wherein said disk controller receives said access request from said second computer, and allows said second compute access a storage area specified by the received address range based on said access list.

3. A computer system according to claim 2, wherein said disk controller receives an access allowance request including an address range, an ID of said second computer, and a password, checks the received password, and registers the received address range and the received ID of said second computer to said access list if the received password is correct.

4. A computer system according to claim 2, wherein said second computer sends a complete report to said first computer after access the target file, said setting means sends a request to said storage system for inhibiting an access from said second computer, and said disk controller delete information concerning to said second computer from said access list according to the request received from said setting means.

5. A computer system according to claim 2, wherein said address obtaining means obtains an address range by referring to file management information stored in said at least one disk device in said storage system.

6. A computer system according to claim 5, wherein said first computer updates said file management information stored in said at least one disk device in said storage system according to a write access from said second computer to said storage system.

* * * * *